May 7, 1935. R. K. STRATFORD ET AL 2,000,672
PROCESS FOR CONTINUOUSLY USING CLAY IN TREATING TOWER SYSTEMS
Filed Jan. 16, 1931
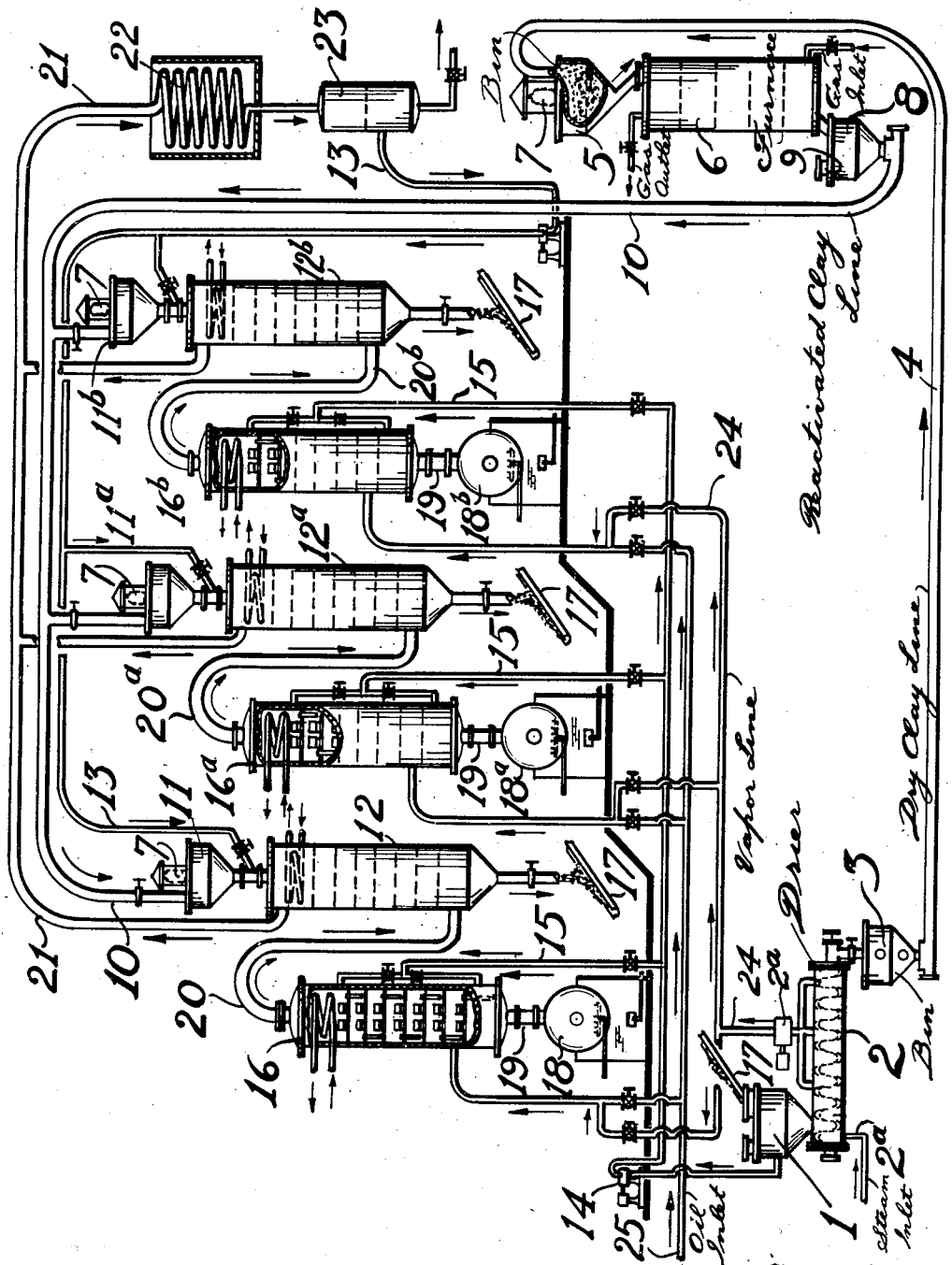
Reginald K. Stratford
Charles B. Leaver  Inventors
W. E. Currie  Attorney Patented May 7, 1935

2,000,672

UNITED STATES PATENT OFFICE 2,000,672

PROCESS FOR CONTINUOUSLY USING CLAY IN TREATING TOWER SYSTEMS

Reginald K. Stratford, Sarnia, Ontario, and Charles Leaver, Toronto, Ontario, Canada, assignors to Standard Oil Development Company, a corporation of Delaware Application January 16, 1931, Serial No. 509,142

3 Claims. (Cl. 196—96)

The present invention relates to the process of handling of clays used in the treating of petroleum products. In the operation of the continuous clay treating tower, such as is shown in United States Patent No. 1,768,342, granted June 24, 1930 to R. K. Stratford, fresh clay is fed to the top of the tower and spent clay and extracted oil withdrawn at the bottom. The mixture of oil and clay is allowed to settle, the oil from the settler A being returned to the still and the wet clay from the settler is dried in suitable vacuum drying equipment. The clay leaving this vacuum drier containing approximately 5% by weight of oil is conveyed by means of a pneumatic conveyer from the vacuum drier to a dry clay bin.

The purpose of the revivifying and handling system described hereinafter is to pick the clay up from the spent clay bin, reactivate and return it to the top of the treating tower for further use as a treating agent. There will be some loss in the reactivation process which will necessitate the addition of a certain quantity of fresh clay to replace this loss. The invention will be fully understood from the following description and the drawing which illustrates one form of apparatus for carrying out the process.

The drawing is a semi-diagrammatic view, partly in section of an apparatus constructed according to our invention and indicates the flow of material.

The clay containing approximately 30% by weight, of oil is fed continuously from the spent clay bin 1 by means of an automatic feeder (not shown) to a continuous clay drier 2. The function of this drier is to reduce the oil content of the clay to below 5% by weight. This is necessary to allow the clay to be handled in pneumatic conveying equipment, as it is impossible to handle clay having a greater oil content than 5% by this means. The dry clay is discharged from the drier by means of a feeder or rotary valve (not shown) to a dry clay bin 3. The clay drier consists of a hot jacketed steel pipe having in it a steel plate ribbon conveyor which carries the clay from inlet to outlet end. The drier is operated under vacuum which may be effected by a pump 2a, and at a temperature sufficiently high to distill the greatest part of the oil content of the clay. Superheated steam by line 2a may also be admitted to the drier to aid the distillation effect.

From the dry clay bin 3 at the exit end of the drier the clay is fed by a suitable feeder (not shown) to a pneumatic transport line 4 which carries it to a second dry clay bin 5 located on top of revivifying furnace 6. This second bin is provided with a bag filter 7 to prevent the loss of clay to the atmosphere with the vent air from the pneumatic conveyor. From this bin the clay is fed by means of an automatic feeder (not shown) to the furnace 6, and the reactivated clay is discharged from the bottom of the furnace to a suitable bin 8. The necessary fresh clay added to the system is fed into this reactivated clay bin by means of inlet 9. The fresh and reactivated clay is then fed by means of a suitable feeder from this bin to a pneumatic conveying system 10 which transfers the clay to small bins 11, 11a and 11b located on top of each of several treating towers, there being one of these small bins mounted on top of each tower. The conveying system is equipped with electro-pneumatic switching valves which permit the delivery of the clay to any one of the three bins as desired. These bins on top of the clay tower are provided with bag filters 7 to prevent the loss of clay with the vent air from the conveying system.

The revivifying furnace 6 is of the vertical rotary type, having several trays or hearths and is gas fired. The material to be roasted enters at the top and works down over the several hearths, being discharged at the bottom, while the gas and products of combustion enter at the bottom, pass over the bottom hearth, thence to the next hearth and so on to the gas outlet located at the top of the furnace.

The reactivated and fresh clay is fed from the bins 11, 11a and 11b to the treating towers 12, 12a and 12b by means of suitable automatic feeders (not shown) which are so constructed, that the feed rate may be varied as desired. These feeders and the feeder on the bin 5 on top of the furnace 6 are equipped with mechanically operated agitators to prevent the clay from arching over the feeder and thus causing a stoppage in the flow of clay to the feeder. A small amount of oil of the same specification as is being treated in the tower is injected by means of pipe line 13 into the clay pipe between the automatic feeder and the tower proper to insure against the clay plugging in the line, thus a constant and uniform quantity of clay is continuously fed to the treating towers.

The spent clay from the treating tower 12 is discharged with part of the extracted oil from the treating process at the bottom of the tower and allowed to run by gravity through trough 17 to tank 1 and settle. The oil is withdrawn from the settler and returned by pipe line 15 and pump 14 to the distillation towers 16, 16a and 16b and the wet clay will again pass to the revivifying process.

The process of treating the hydrocarbon oil has been previously described in Patent 1,768,342 to R. K. Stratford, the oil being vaporized in stills 18, 18a and 18b and the vapors conducted by means of vapor line 19 to fractionating towers 16, 16a and 16b and from there entering treating towers 12, 12a and 12b through pipe lines 20, 20a and 20b. The vapors pass up through the treating towers and are removed by pipe line 21 to condenser 22 and flow into receiver 23. The oil from the drier 2 is vaporized and returned to the still by means of pipe line 24. The oil to be treated is fed by line 25 to the bottom of towers 16, 16a and 16b. The preferred form of the invention described may be modified in various ways within the scope of the appended claims, in which it is our intention to claim all novelty inherent in the invention, as broadly as the prior art permits.

As employed herein, the term "clay" is intended to designate solid adsorptive materials having the effect of selectively polymerizing undesirable unstable unsaturated constituents of cracked petroleum oils to higher-boiling products, and including such materials as fuller's earth, adsorbent clays such as Attapulgus clay, and the like.

We claim:

1. The continuous process of treating hydrocarbon oil with clay, which comprises: vaporizing the oil, passing the vaporized oil into a treating zone wherein the vaporized oil is caused to pass in countercurrent to a flow of treating material comprising clay and condensate produced from the vapors, removing condensed treated oil and clay from said clay-treating zone, mechanically separating the major part of the oil from the clay, and reducing the separated clay to a substantially dry state by distilling it under the application of heat and subatmospheric pressure, revivifying the thereby dried clay by means of hot combustion gases and returning it to said treating zone.

2. The continuous process of treating hydrocarbon oil with clay which comprises vaporizing the oil, passing the vaporized oil into a clay-treating and partial-condensation zone, passing condensed treated oil and clay from said treating zone into a separating zone, mechanically separating the major part of the oil from the clay, returning the separated oil to the vaporizing step, passing the separated clay into a zone in which oil retained by the clay is distilled off by application of heat and subatmospheric pressure, passing the thereby substantially dried clay containing only a small percentage of oil to a revivifying zone, revivifying said clay by means of hot combustion gases and returning the revivified clay to the treating zone.

3. Process according to claim 2, in which the dry clay contains about 5% of oil.

REGINALD K. STRATFORD.
CHARLES LEAVER.